No. 863,602. PATENTED AUG. 20, 1907.
E. A. HALL.
AIR SUPPLYING AND PRESSURE REGULATING MEANS
FOR AIR AND GAS MIXING APPARATUS.
APPLICATION FILED MAY 15, 1906.

Witnesses:

Inventor:
E. A. Hall

No. 863,602. PATENTED AUG. 20, 1907.
E. A. HALL.
AIR SUPPLYING AND PRESSURE REGULATING MEANS
FOR AIR AND GAS MIXING APPARATUS.
APPLICATION FILED MAY 15, 1906.

No. 863,602. PATENTED AUG. 20, 1907.
E. A. HALL.
AIR SUPPLYING AND PRESSURE REGULATING MEANS
FOR AIR AND GAS MIXING APPARATUS.
APPLICATION FILED MAY 15, 1906.

Witnesses:

Inventor.
E. A. Hall
by
Attorneys.

No. 863,602. PATENTED AUG. 20, 1907.
E. A. HALL.
AIR SUPPLYING AND PRESSURE REGULATING MEANS
FOR AIR AND GAS MIXING APPARATUS.
APPLICATION FILED MAY 15, 1906.

No. 863,602. PATENTED AUG. 20, 1907.
E. A. HALL.
AIR SUPPLYING AND PRESSURE REGULATING MEANS
FOR AIR AND GAS MIXING APPARATUS.
APPLICATION FILED MAY 15, 1906.

No. 863,602.  
E. A. HALL.  
PATENTED AUG. 20, 1907.

AIR SUPPLYING AND PRESSURE REGULATING MEANS FOR AIR AND GAS MIXING APPARATUS.

APPLICATION FILED MAY 15, 1906.

UNITED STATES PATENT OFFICE.

EDWIN A. HALL, OF HYDE PARK, MASSACHUSETTS, ASSIGNOR TO AIRIFIED GAS HEATING AND POWER COMPANY, OF BOSTON, MASSACHUSETTS, A CORPORATION OF ARIZONA TERRITORY.

AIR-SUPPLYING AND PRESSURE-REGULATING MEANS FOR AIR AND GAS MIXING APPARATUS.

No. 863,602.      Specification of Letters Patent.      Patented Aug. 20, 1907.

Application filed May 15, 1906. Serial No. 316,963.

*To all whom it may concern:*

Be it known that I, EDWIN A. HALL, of Hyde Park, in the county of Norfolk and State of Massachusetts, have invented certain new and useful Improvements in Air-Supplying and Pressure-Regulating Means for Air and Gas Mixing Apparatus, of which the following is a specification.

This invention relates chiefly to apparatus for mixing air and gas to produce a combustible mixture, adapted either for illuminating or for heating purposes.

The invention has for its object, first to provide a simple and efficient automatic apparatus for producing a current of air of regulated pressure, free from spasmodic variations or fluctuations which would be liable to affect the steadiness of a flame produced by a mixture of the air current with a suitable proportion of gas.

The invention also has for its object to enable the pressure of the air current to regulate the pressure of the gas which is mixed with the air to form the said combustible mixture.

The invention also has for its object to provide apparatus comprising means operated by the stoppage of the air-forcing apparatus for shutting off the supply of gas, so that in the event of the stoppage of the supply of air, the supply of gas will be automatically shut off, thus preventing the damage or disaster which might occur if the gas were supplied alone to the mixing apparatus and the burners supplied thereby.

The invention consists in several improvements, which I will now proceed to describe and claim.

Of the accompanying drawings, forming a part of this specification.

Figures 5, 6:
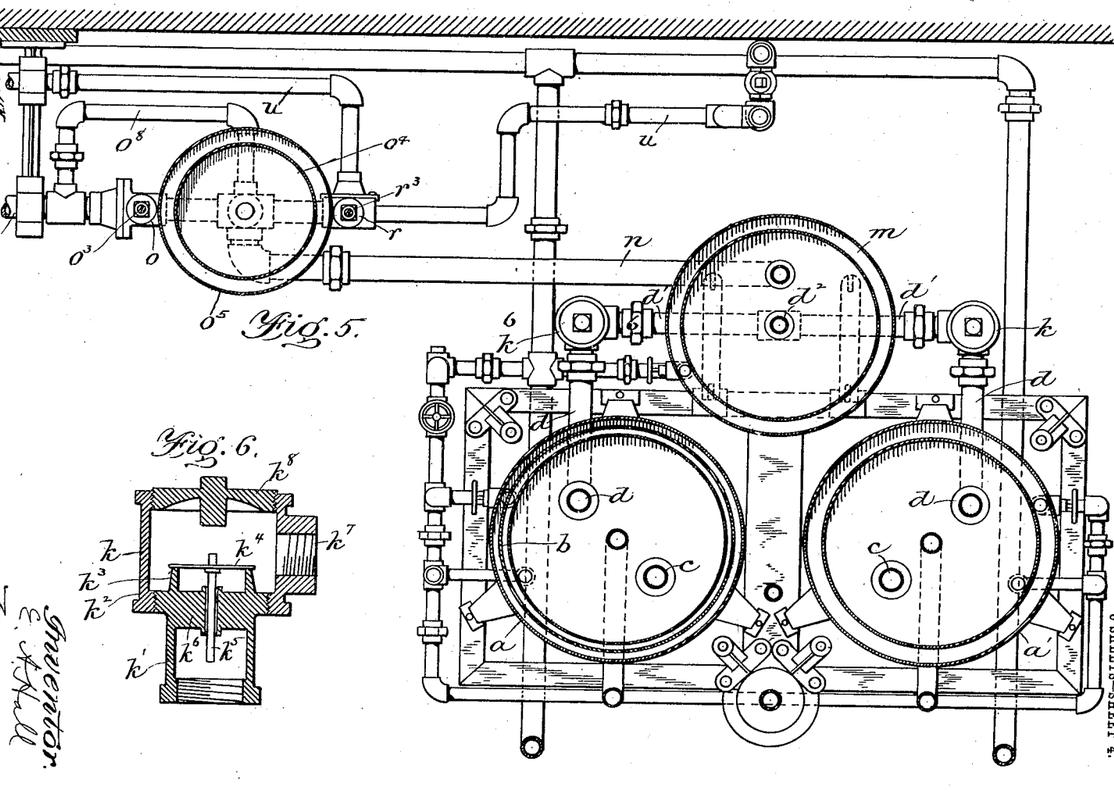
Fig. 5 represents a section on line 5—5 of Fig. 2.
Fig. 6 represents a section on line 6—6 of Fig. 5.
Figures 7, 8, 9, 10, 11:
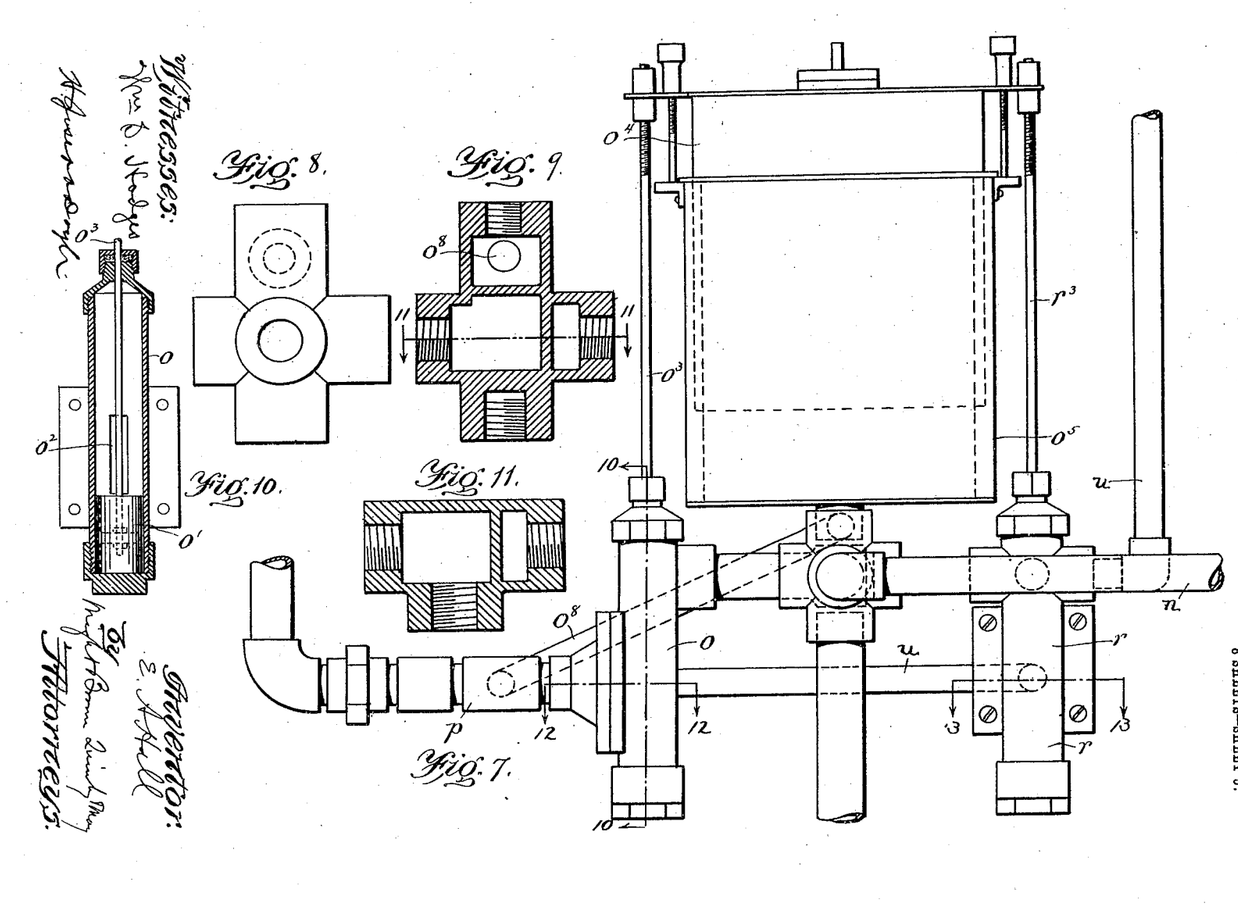
Fig. 7 represents an enlargement of a portion of Fig. 1.
Fig. 8 represents a side view of a portion of Fig. 7.
Fig. 9 represents a sectional view of the portion shown in Fig. 8.
Fig. 10 represents a section on line 10—10, Fig. 7.
Fig. 11 represents a section on line 11—11, Fig. 9.

In the drawings,—$a\ a'$ represents two tanks, each open at its upper end, and adapted to hold a body of water, or other sealing fluid, the tanks being preferably annular as shown in Fig. 5.

Figure 1:
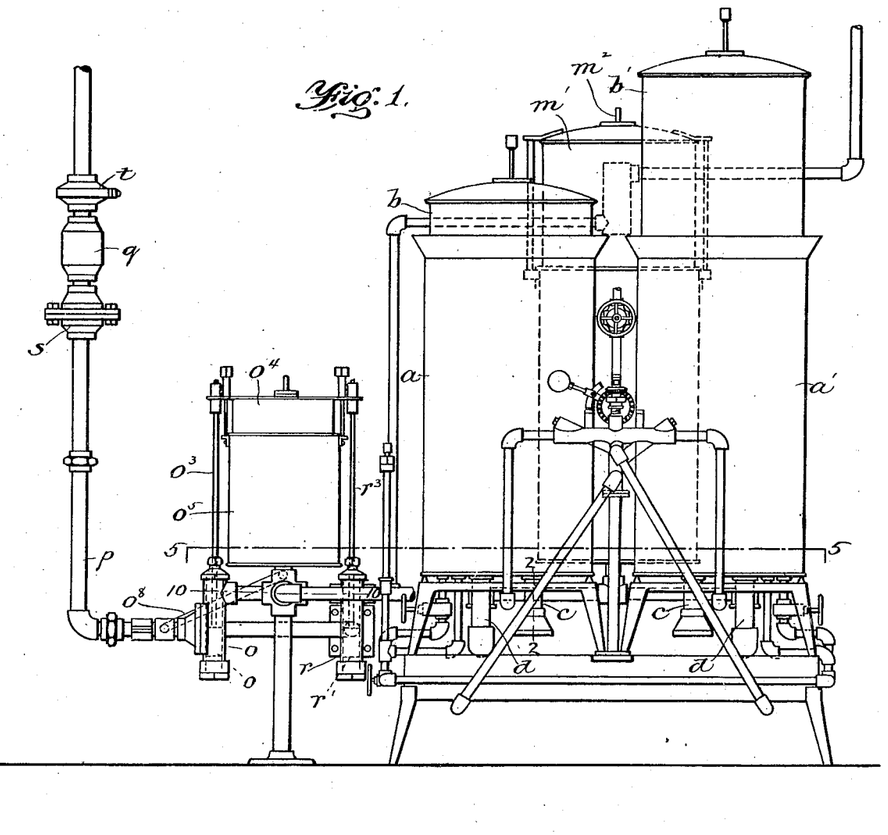
—Figure 1 represents a side elevation of an apparatus embodying my invention.
Figure 2:
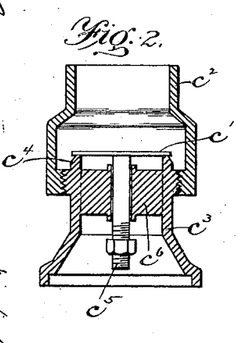
Fig. 2 represents a section on line 2—2, Fig. 1.
Figure 3:
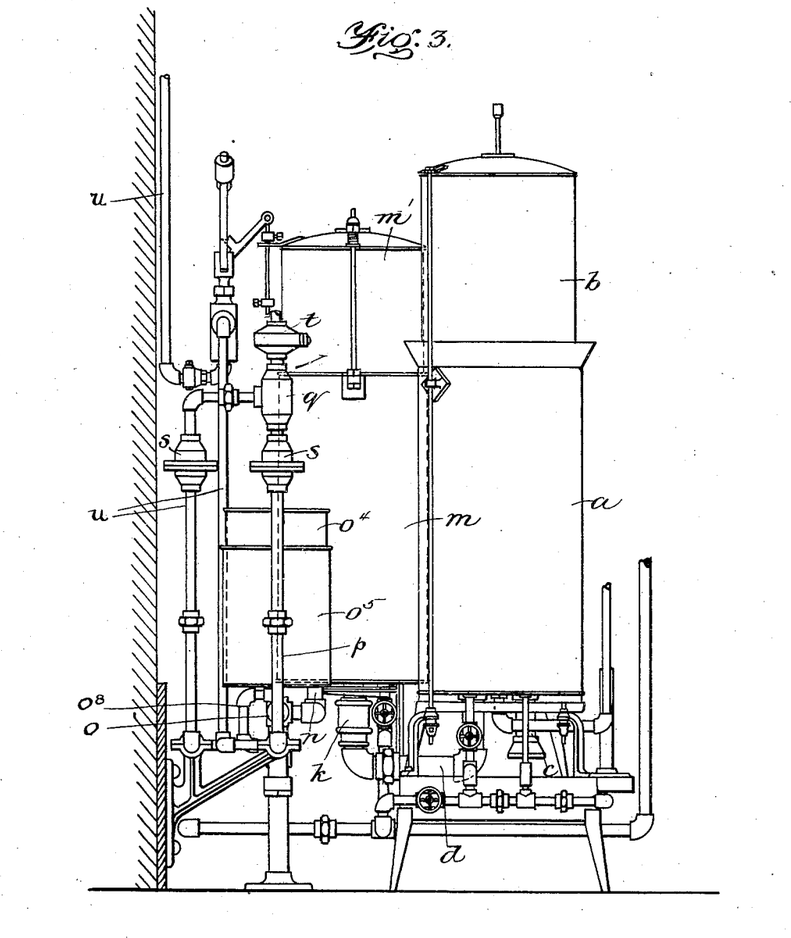
Fig. 3 represents an end elevation.

$b\ b'$ represents inverted air-pumping tanks or air-bells, each open at its lower end, the said bells being movable vertically in the tanks $a\ a'$, and sealed at their lower ends by the water in the tanks, each tank and bell constituting an air-pump. Into each bell extends an air-induction pipe $c$ open to the atmosphere at the bottom of the tank, each pipe having a valve $c'$ (Fig. 2) at its lower portion, adapted to permit the entrance of air to the bell, and prevent the escape of air from the bell, through the pipe $c$. Each air valve is contained in a casing composed of sections $c^2\ c^3$ screwed together as shown in Fig. 2, the section $c^2$ being internally screw-threaded at its upper portion to engage a thread on the lower end of the pipe $c$, and enlarged at its lower portion to form a chamber surrounding a valve seat $c^4$ formed on the upper end of the section $c^3$. The valve $c'$ rests loosely on said seat, and its stem $c^5$ is movable in a guide $c^6$ in the section $c^3$. The valve casing is located below the bottom of the tank, and its lower section $c^3$ is accessible under the tank, so that it may be readily removed to permit access to the valve without disturbing any of the other parts of the apparatus.

Figure 4:
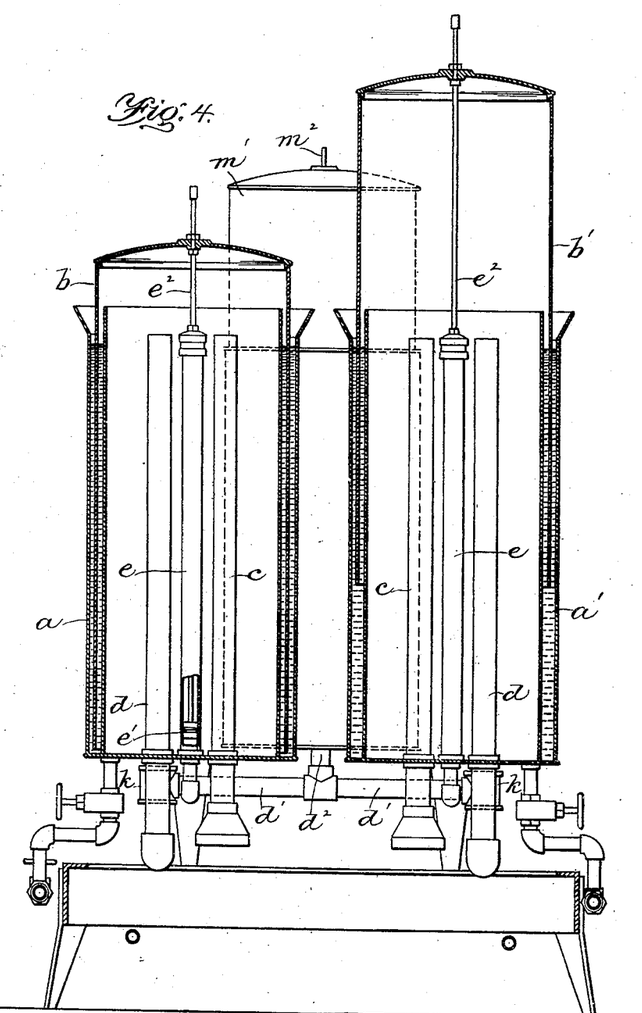
Fig. 4 represents a partial sectional view and partial side elevation, showing an apparatus embodying my invention.

From each bell extends an air-outlet pipe $d$ which passes through the bottom of the tank. Each bell is alternately raised to draw air through its induction-pipe, and released and allowed to descend from its raised position to force the air through the out-let pipe, this being effected by hydraulic motors in the tanks $a\ a'$. Each motor comprises a cylinder $e$ affixed to the bottom of the tank, a piston $e'$ (Fig. 4) in the cylinder, and a rod $e^2$ extending through a stuffing-box at the upper end of the cylinder and secured to the head of the bell. Water under pressure is alternately admitted to and shut off from the cylinder, the water raising the piston and the bell connected therewith. When the water is shut off from the cylinder, a vent from the latter is opened, so that the water in the cylinder is released, and the piston and bell are allowed to descend, the descent of the bell forcing the air through the out-let-pipe. The two motors are operated alternately, so that when one air-bell is rising, the other is descending. To this end, water is admitted to the cylinders $e\ e$, alternately by suitable automatic means.

The air-outlet pipes $d\ d$ from the two pumps discharge into valve chambers $k\ k$ (Fig. 6), which are connected by pipes $d\ d'\ d^2$ with a pressure equalizer, preferably composed of an annular tank containing a sealing liquid, and an inverted floating tank or bell $m'$ movable in the tank $m$ and sealed by the liquid therein. The bell $m'$ may be provided with means such as a spindle $m^2$ for engaging removable weights. A pipe $n$ conducts the air away from the pressure equalizer. The air entering the cylinder is subjected to constant pressure by the weighted bell $m'$, so that the pressure in the pipe $n$ is not affected by the stoppages and reversals of movement of the air-bells. Each valve chamber $k$ is composed of separable screw-threaded sections $k'$ $k^2$, as shown by Fig. 6. The section $k'$ has a valve seat $k^3$, on which rests a valve $k^4$, the stem $k^5$ of which is movable in a guide $k^6$ in the section $k'$. The section $k'$ is internally threaded to engage one of the outlet pipes $d$. The section $k^2$ has an internally threaded branch $k^7$ to engage one of the pipes $d'$, and a screw-threaded cap $k^8$, the removal of which permits access to the valve $k^4$ and its seat. The valves $k^4$ prevent backward movement of air in the pipes connecting the pumps with the pressure equalizer. The chambers $k$, containing said valves, are exposed so that the caps $k^8$ are readily accessible, to permit removal and replacement of the valves. The outlet-pipe $n$ constitutes a part of an air conduit, which includes a casing, containing a valve $o'$ adapted to vary the area of port $o^2$, at the outlet side of said casing through which air passes from the casing $o$ through a pipe $p$, forming a portion of said conduit, to a mixing-chamber $q$. The port $o^2$ is a narrow elongated slot extending lengthwise of the casing $o$, and the valve, which is movable lengthwise of the casing, varies the operative length of the port when it is raised or lowered. The stem $o^3$ of the valve is attached to an inverted cup or bell $o^4$, which floats in and is sealed by a body of glycerin or other suitable fluid confined in an annular tank $o^5$.

Figures 12, 13, 14:
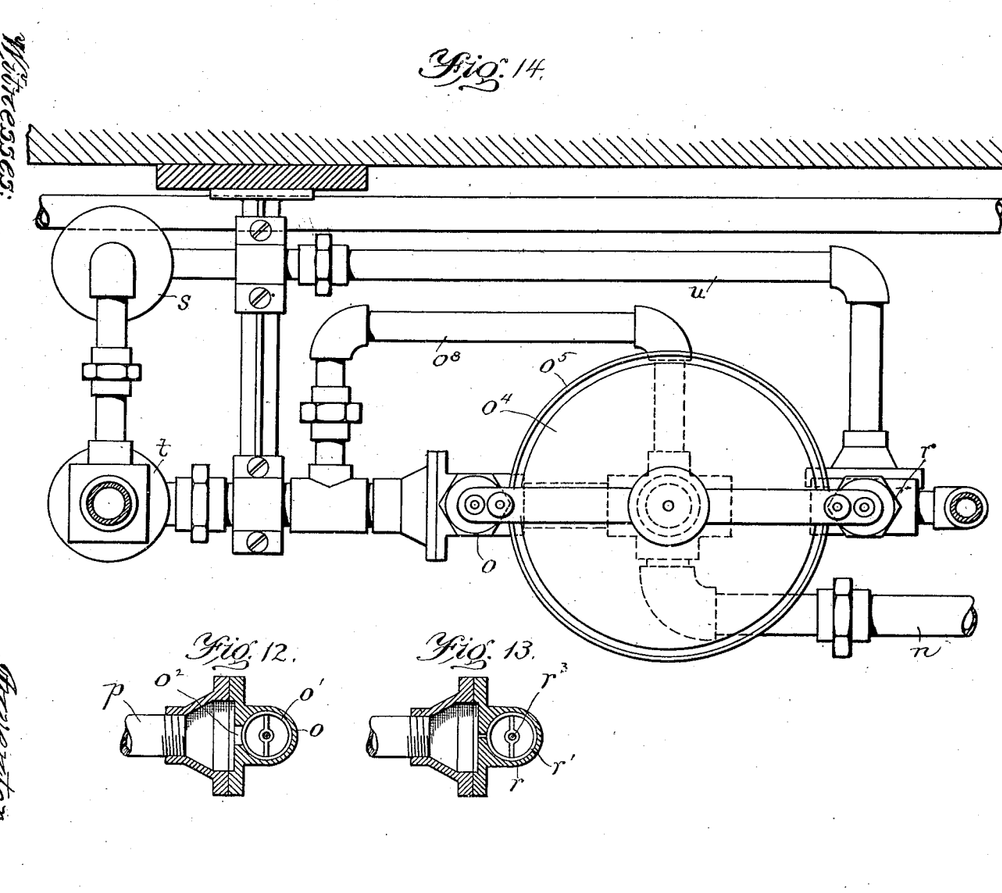
Fig. 12 represents a section on line 12—12, Fig. 7.
Fig. 13 represents a section on line 13—13, Fig. 7.
Fig. 14 represents an enlargement of a portion of Fig. 5.

Gas is delivered to the mixing chamber $q$ by a conduit $u$ which includes a gas-valve casing $r$, containing a valve $r'$ (Fig. 13), said casing and valve being similar to the air-valve casing and its valve above described, with the exception that the gas ports are narrower than the air ports. The stem $r^3$ of the gas-valve $r'$ is attached to the bell $o^4$. The casing $r$ is connected by suitable pipe connections with a source of supply of gas under pressure and with the mixing chamber. The pipes connecting the air and gas valve casings with the mixing chamber are provided with enlargement $s$, containing mercury-sealed valves, adapted to prevent backward flow of air and gas from the mixing chamber.

$t$ represents a supplemental mixing-chamber, connected with the chamber $q$, and provided with several wire-gauze partitions, through which the gas and air pass, said partitions insuring a thorough mixture of the gas and air, the mixture passing through a service-pipe to the burners.

The portion $p$ of the air conduit, connecting the air valve casing $o$ with the mixing chamber, is connected by a branch $o^8$ with the bottom $o^6$ of the tank $o^5$, said branch constituting the only means for admitting air pressure to the bell $o^4$. The pipe $p$ is the portion of the air conduit located at the outlet side of the valve casing $o$, so that the pressure in the conduit at the outlet side of the air valve controls the position of the air valve. Hence an increase of pressure under the bell, due to a decrease consumption of the mixture of air and gas at the burners supplied by the mixing chamber, will raise the bell $o^4$, and partially close the valves $o'$, $r'$ causing said valves to decrease the flow of air and gas simultaneously, while a decrease in pressure, due to an increased consumption of the mixture, will permit the bell $o^4$ to descend and increase the flow of air and gas. The bell $o^4$ and the air valves, connected therewith, constitute an air pressure regulator, which coöperates with the pressure equalizer and the two alternately acting air pumps in producing a current of air of regulated pressure, free from spasmodic variations or fluctuations. The bell $o^4$ is utilized also as a part of the means for regulating the gas pressure so that a uniform regulation of both the air and the gas pressure is provided, and the number of parts reduced to the minimum.

It will be seen that, in case of stoppage of the air-forcing apparatus, the bell $m'$ of the pressure equalizer will immediately descend, by reason of the escape of air from its interior through the conduit $n$. I utilize this descent of the bell $m'$ to shut off the gas-supply through the conduit $u$ and thus prevent the possibility of the supply of gas alone to the mixer. In carrying out this part of my invention, I provide the gas conduit $u$ with a section $u'$, which is preferably cylindrical and is connected at one end with a part of the conduit $u$, and is provided at a distance from said end with a port $u^2$ which communicates with another part of said conduit.

Figures 16, 17:
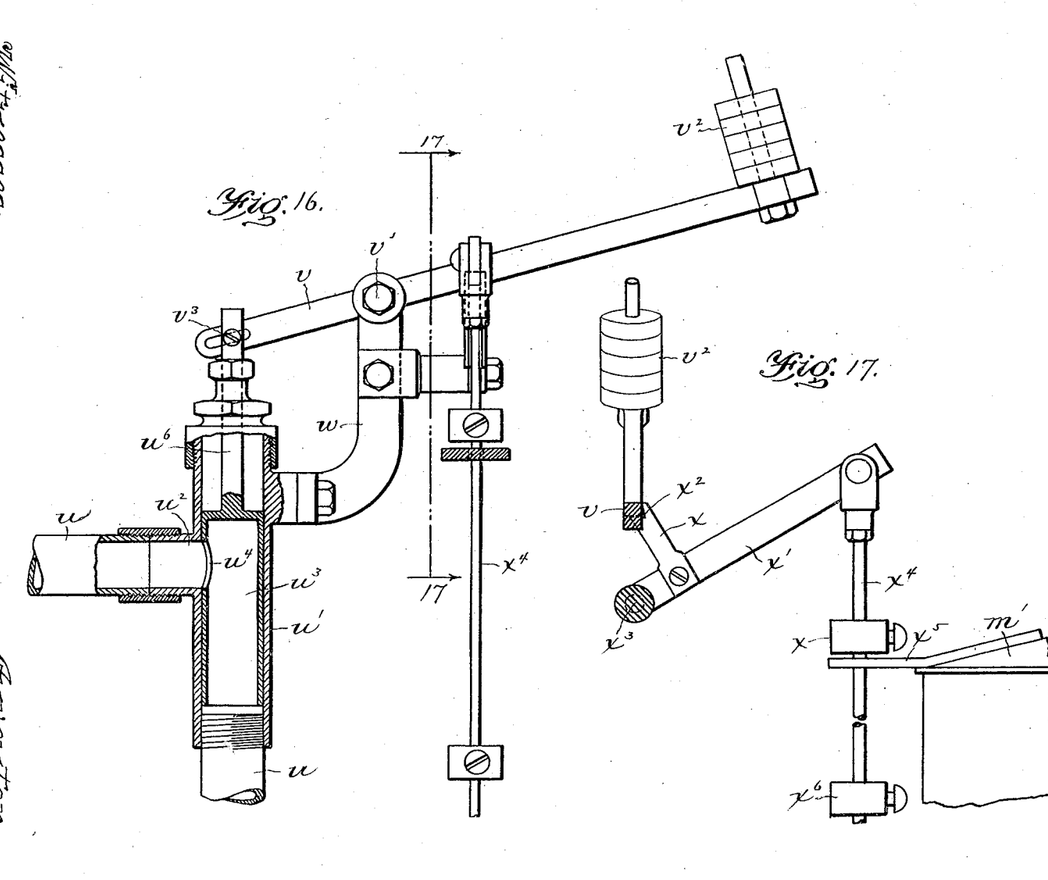
Fig. 16 represents an elevation partly in section of a portion of the apparatus.
Fig. 17 represents a section on line 17—17, Fig. 16.

$u^3$ represents a piston-valve which is fitted to slide in the section $u'$ and has a port $u^4$ adapted to coincide with the port $u^2$, as shown in Fig. 16, thus making the gas-conduit continuous. When the valve $u^3$ is raised to move the port $u^4$ for connection with the port $u^2$, the gas-conduit is closed, and the supply of gas to the mixer is shut off.

$v$ represents a lever which is fulcrumed at $v'$ to an arm $w$ affixed to the conduit-section $u'$, one arm of said lever having a weight $v^2$, while the other is connected at $v^3$ with the stem $u^6$ of the valve $u^3$. When the weighted arm of the lever $v$ is free to descend, it raises the other arm and the valve $u^3$ sufficiently to close the gas-conduit. The lever $v$ is locked with the valve in its open position, as shown in Fig. 16, by means of a detent $x$, which is an arm affixed to a lever $x'$ and having a notch $x^2$ (Fig. 17) at its outer end to engage the lower edge of the lever $v$. The lever $x'$ is pivoted to a stud $x^3$ on the arm $w$.

Figure 15:
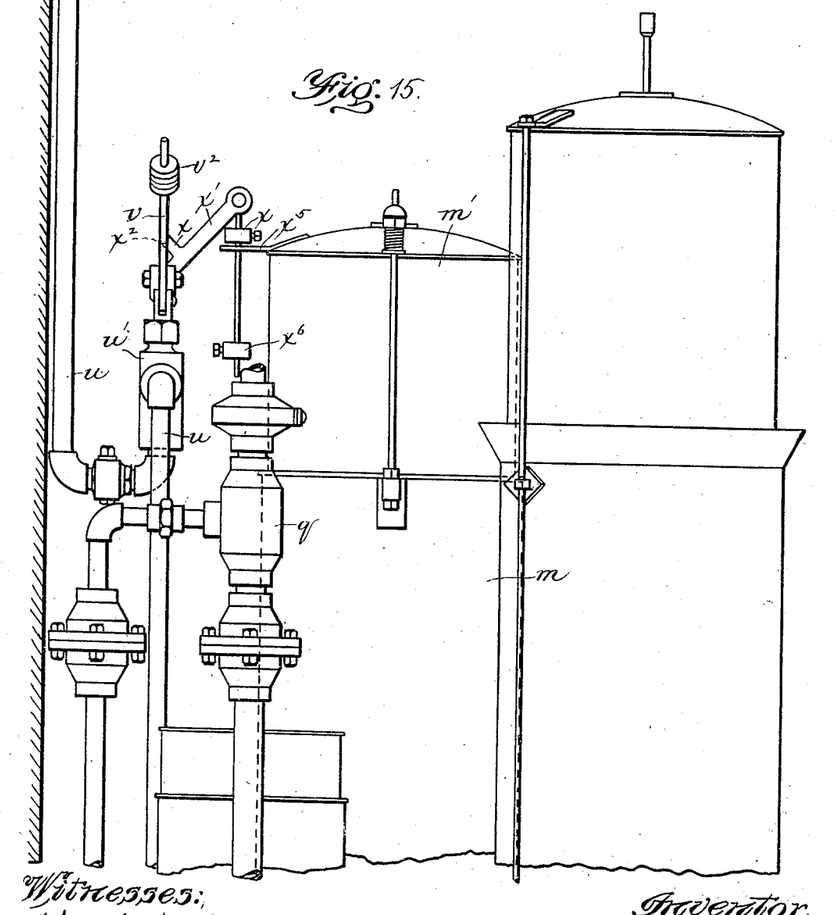
Fig. 15 represents an enlargement of a portion of Fig. 3.

$x^4$ represents a rod which depends from the lever $x'$ beside the storage-bell $m'$ and passes through a slot or opening in an arm $x^5$ affixed to said bell. The rod $x^4$ has a shoulder or collar $x^6$, located below the arm $x^5$. When the bell $m'$ is supported by the air pressure, the arm $x^5$ is separated from the shoulder $x^6$, as shown in Figs. 15 and 17. In case of the stoppage of the air-forcing apparatus, the resulting downward movement of the bell $m'$ causes the arm $x^5$ to bear upon the collar $x^6$, thus depressing the rod $x^4$ and lever $x'$, and moving the detent $x$ outwardly from engagement with the lever $v$, the weighted end of the latter being thus allowed to fall and close the valve $u^3$, thus shutting off the supply of gas from the mixer. The gas-conduit remains closed until the lever $v$ is again raised and locked by an attendant, so that in case the stoppage of the air-forcing apparatus is only temporary and is automatically resumed, there will be no admission of gas to the mixer until the party in charge of the apparatus has opened the gas conduit.

I claim:—

1. An apparatus of the character stated, comprising two alternately acting air pumps, a pressure equalizer, connections between said pumps and the equalizer through which the equalizer removes air from the pumps, a conduit through which air passes from the equalizer, and a pressure regulator including a valve casing forming a part of said conduit, a valve in said casing, a sealing tank, and an air bell movable in the tank and means controlled by the pressure in the portion of the conduit at the outlet side of the valve casing for determining the position of the valve.

2. An apparatus of the character stated, comprising two alternately acting air pumps, a pressure equalizer, connections between said pumps and the equalizer through which the equalizer removes air from the pumps, a conduit through which air passes from the equalizer, and a pressure regulator including a valve casing forming a part of said conduit, a valve in said casing, a sealing tank and an air bell movable in the tank and connected with said valve, the portion of the conduit at the outlet side of said casing having a branch communicating with the tank of the pressure regulator, whereby the pressure in said portion is caused to determine the position of the air bell and valve of the pressure regulator.

3. In an air and gas mixing apparatus, an air conduit, including a valve casing, means for forcing air through said conduit, an air-pressure regulating valve in said casing, and valve controlling means operated by air pressure in the portion of the conduit at the outlet side of the casing, combined with a gas conduit, including a valve casing, a gas-pressure regulating valve in said casing, and a connection between the gas valve and the said controlling means whereby the gas-pressure is regulated simultaneously with and by the action of the air-pressure.

4. In an air and gas mixing apparatus, an air conduit, including a valve casing, means for forcing air through said conduit, an air-pressure regulating valve in said casing, a sealing tank adjacent to said valve casing, an air bell movable in said tank, a connection between said bell and the air-pressure regulating valve, a branch connecting the portion of the air conduit at the outlet side of the valve casing with the air bell, a gas conduit including a valve casing adjacent to the sealing tank, and a gas pressure regulating valve in said casing, said valve being connected with the air bell.

5. An apparatus of the character stated comprising conduits for delivering air and gas, air forcing mechanism communicating with said air conduit, a shut off valve in the gas conduit, a weighted closing lever connected thereto, means for propping said weighted lever in position to hold said valve normally open, and means operated by the stoppage of the air forcing mechanism for withdrawing said propping means.

6. An apparatus of the character stated comprising conduits for delivering air and gas, air forcing mechanism communicating with the air conduit, a shut off valve in said gas conduit provided with a weighted closing lever, a prop to engage said lever to hold said valve normally open, and means operated by the stopping of the air forcing mechanism for displacing said prop and releasing the lever and valve.

7. An apparatus of the character stated comprising conduits for delivering air and gas, air forcing mechanism communicating with the air conduit and including a movable air bell which is supported in a raised position by air pressure when the air forcing mechanism is in operation, a normally closed shut-off valve in the gas conduit, an operating lever connected at one end to said valve, means for propping the free end of said lever to lock said valve in an open position, and means operated by the depression of the bell to withdraw said prop and thereby release said valve.

8. An apparatus of the character stated comprising conduits for delivering air and gas, air forcing mechanism communicating with the air conduit and including a movable air bell which is supported in a raised position by the air pressure when the air forcing mechanism is in operation, a shut off valve in said conduit provided with a weighted closing lever, a locking device or detent for propping the weighted end of said lever to hold said valve in an open position, and connections between the detent and the bell for causing the descent of the bell to displace the detent.

9. An apparatus of the character stated, comprising conduits for delivering air and gas, air-forcing mechanism communicating with the air conduit and including a movable air bell which is supported in a raised position by air pressure when the air-forcing mechanism is in operation, a shut-off valve in said conduit provided with a weighted closing lever, a locking device or detent for supporting the weighted end of said lever to hold the valve in a normally open position, a lever attached to the detent, a shouldered rod connected with the lever, and an arm on the bell adapted to engage said rod.

In testimony whereof I have affixed my signature, in presence of two witnesses.

EDWIN A. HALL.

Witnesses:
  C. F. BROWN,
  L. KENNEDY.